US007885786B2

(12) United States Patent
Mysore et al.

(10) Patent No.: US 7,885,786 B2
(45) Date of Patent: Feb. 8, 2011

(54) SLEEVE CONE QUALITY MEASUREMENT SYSTEM AND METHOD

(75) Inventors: Ananda V. Mysore, Sunnyvale, CA (US); Steve G. Gonzalez, Santa Cruz, CA (US); Reid E. Berry, II, Ben Lomond, CA (US); Hans Leuthold, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 150 days.

(21) Appl. No.: 12/252,046

(22) Filed: Oct. 15, 2008

(65) Prior Publication Data
US 2010/0094587 A1    Apr. 15, 2010

(51) Int. Cl.
G01B 7/00    (2006.01)
G01B 5/004    (2006.01)

(52) U.S. Cl. .......................................... 702/155; 33/503

(58) Field of Classification Search ................. 702/155, 702/81; 33/503, 552; 356/445, 625
See application file for complete search history.

(56) References Cited

U.S. PATENT DOCUMENTS

| 2,052,153 | A | 8/1936 | Willis |
|---|---|---|---|
| 2,551,471 | A | 5/1951 | Snow |
| 2,825,975 | A | 3/1958 | Cameron et al. |
| 2,943,394 | A | 7/1960 | Schabot |
| 3,831,283 | A | 8/1974 | Pagella et al. |
| 4,631,834 | A | 12/1986 | Hayashi et al. |
| 4,676,649 | A | 6/1987 | Phillips |
| 4,778,313 | A | 10/1988 | Lehmkuhl |
| 5,068,972 | A | 12/1991 | Herzog et al. |
| 5,088,208 | A | 2/1992 | Wells et al. |
| 5,125,789 | A | 6/1992 | Farr |
| 5,682,682 | A | 11/1997 | Renfrew et al. |
| 5,705,741 | A | 1/1998 | Eaton et al. |
| 5,781,450 | A | 7/1998 | Glasson |
| 5,822,877 | A | 10/1998 | Dai |
| 6,065,220 | A | 5/2000 | Ohtsuka et al. |
| 6,141,885 | A | 11/2000 | Ishitani et al. |
| 6,229,297 | B1 | 5/2001 | Bohn |
| 6,260,282 | B1 | 7/2001 | Yuan et al. |
| 7,047,657 | B2 | 5/2006 | Goeggelmann et al. |
| 7,159,327 | B2 | 1/2007 | Baruchello et al. |
| 7,350,308 | B2 | 4/2008 | Mysore et al. |

(Continued)

OTHER PUBLICATIONS

I.C. Gupta, A Text Book of Engineering Metrology, 1996, Fifth Edition, pp. Contents, 271-320, 346-356, 401-409, 687-703, Dhanpat Rai Publications (P) Ltd., Daryaganj, New Delhi.

(Continued)

*Primary Examiner*—Bryan Bui

(57) ABSTRACT

A metrology system for measuring a cone angle, a cone straightness, and a cone quality of a sample and method of using the metrology system are disclosed. The system includes a rotary stage, one or more workpiece fixtures that hold the samples in the rotary stage, and a number of different sized measurement devices. The measuring devices are positioned next to the rotary stage and measure the samples using contact. The rotary stage is free to rotate when the measuring devices are in a non-measuring state. The invention also includes a processor that collects data from the measurement devices and calculates the cone angle, the cone straightness, and the cone quality of each sample based on the data.

22 Claims, 6 Drawing Sheets

U.S. PATENT DOCUMENTS

| | | |
|---|---|---|
| 7,421,795 B2 | 9/2008 | Mysore et al. |
| 2002/0148130 A1 | 10/2002 | Ohtsuka |
| 2002/0152619 A1 | 10/2002 | Ito et al. |
| 2007/0137056 A1 | 6/2007 | Mysore et al. |
| 2008/0028627 A1 | 2/2008 | Mysore et al. |
| 2008/0065339 A1 * | 3/2008 | Finarov et al. ............ 702/81 |

OTHER PUBLICATIONS

Shri Krishna Kimothi, "The Uncertainty of Measurements: Physical and Chemical Metrology: Impact and Analysis," 2002, pp. 1-19, 81-105, 270-298 and Index, ASQ Quality Press, Milwaukee, Wisconsin.

Encoder Technology Limited, "Heidenhain-Metro: Length Gauges", Surrey, UK. Available online as of Nov. 25, 2008 at http://www.encoder-technology.com/products/heidenhain/lengthgauge/metrohighaccuracylengthgauges.pdf.

Ernest O. Doebelin, "Measurement Systems: Application and Design," 1989, Fourth Edition, pp. Index and 37-98 (Chapter 3), McGraw-Hill, Inc., New York, NY.

* cited by examiner

SLEEVE CONE QUALITY MEASUREMENT SYSTEM AND METHOD

BACKGROUND

1. Field

The current invention is in the field of metrology of objects. Particularly, the invention relates to metrology of angles, quality, and anomalies in a cone.

2. Related Art

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density of media has tended to increase and the size of storage systems has tended to decrease. This trend has led to a need for greater precision, which has resulted in tighter tolerancing for components used in disc drives. In turn, achieving tighter tolerances in components requires increased precision in metrology systems for characterizing and parameterizing those components. Measuring angles of objects is one aspect of metrology, and measuring angles of conical cavities is of interest for some disc drive designs.

Metrology systems may include systems that use technology requiring contact with a workpiece as well as systems that obtain metrology data without contacting a workpiece. It is often the case that non-contact systems can be more precise than contact systems, but can be more expensive.

U.S. Pat. No. 7,350,308 ("the '308 patent"), herein incorporated by reference in its entirety, is an exemplary system used for measuring the angle of conical cavities. The system uses a two sphere method to determine the each cone's characteristics. FIG. 1 illustrates aspects of the conceptual two sphere method for deriving an angle $2\theta$ 114 of a conical cavity 108 (shown in cross-section), that may exist for example in a conical bearing sleeve. A first sphere 112 having a known (or determinable) diameter is inserted in the conical cavity 108. A first height 104 associated with positioning of the first sphere 112 is measured. This measurement may be with respect to reference 102. The first sphere 112 may then be removed from conical cavity 108. A second sphere 110 is inserted into the conical cavity 108. A second height 106 associated with positioning of the second sphere 110 is measured; second height 106 may also be a measurement with respect to the reference 102. After obtaining the first height 104 and the second height 106, an angle equal to one half the angle $2\theta$ 114 may be calculated by application of the formula below, where R1, H1, R2, and H2 respectively refer to the radius of the first sphere 112, the first height 104, the second sphere 110, and the second height 106.

$$\theta = \alpha\sin\left[\frac{(R_1 - R_2)}{(H_2 - H_1) - (R_1 - R_2)}\right]^{-1}$$

FIG. 2 shows the system 200 described in the '308 patent. Base 203 supports stage guide 202. Stage guide 202 includes a first rail 282, a second rail 284, and a top portion 286. The stage 204 interfaces with first rail 282 and second rail 284, which provide guidance to stage 204 as it moves along the stage guide 202. The stage 204 also fits closely to the top portion 286, which is expected to aid in reducing variation of distance between a workpiece disposed in fixture 234 and gauges 214, 212. By reducing variation, the stage is expected to increase accuracy and repeatability because changes in amount of extension of plungers (not shown) due to such variations would be reduced, and therefore measurement error and variations between measurements would be reduced.

The stage 204 may be an air bearing stage with a relatively small positioning error and a motion control system that can provide approximately constant velocity. Air bearing stages also help lower error because they tend to distribute load over a large surface area and often have good stiffness which is often desirable for heavy or offset loading. Also, the air bearing of an air bearing stage has an inherent averaging effect that helps in error reduction by filling small surface voids and other irregularities, which is thought to provide better pitch, roll, yaw, and straightness and flatness specifications. An exemplary air bearing stage is the ABL 1000 (FiberGlide 1000) manufactured by Aerotech.

However, there are several drawbacks to the system disclosed in the '308 patent. First of all, since only one sample can be measured at a time, it takes approximately 30 second to measure each sample. Secondly, the system is unable to measure cone straightness. Cone straightness refers to the quality of the sides of the cone. FIG. 3 illustrates some possible undesirable defects in the sides 310 and 315 of a cone 300 that effect cone straightness. Such defects may include a bump 320 as shown in side 310 or a cavity 325 as shown in side 315. Thirdly, the system is sensitive to the effects of particles and other system noise.

Therefore, what is needed is a low-cost, accurate, and repeatable metrology system that is fast, and able to measure cone straightness and cone quality in addition to cone angle.

SUMMARY

One aspect of the invention provides a metrology system comprising a rotary stage, at least one holding fixture, each for holding at least one conical sample. The system also comprises a plurality of differently sized measurement devices positioned adjacent to the rotary stage for interfitting, in a measuring state, with the samples. The interfitting is for obtaining data useful in determining one or more characteristics of the samples. The rotary stage is free to rotate when the measuring devices are in a non-measuring state. The system also comprises a processor in communication with the measurement devices, and operable to use the data from the measurement devices for calculating a cone angle, a cone straightness, and a cone quality of each sample.

Each measurement device may include a contact element, a plunger, and a gauge to measure distance the plunger has extended when the contact element touches with the sample. The fixture may include an element to increase compliance of the fixture to misalignments between the contact element and the workpiece(s). The compliance element may include a low-friction surface on which the workpiece can move, such as a surface having sapphire.

Another aspect of the invention provides a method for measuring a conical workpiece's angle of taper, straightness, quality. The method includes the steps of placing at least one sample into a sample slot in a rotary stage, extending a number of differently sized measuring devices for contacting each sample and recording an amount of extension of each measuring device, retracting the measuring devices, rotating the rotary stage to a subsequent position wherein at least one sample slot is aligned with one measuring device, repeating the above steps until each sample is measured by each measuring device, compiling a data set of recorded extensions of each measuring device for each sample, and calculating a cone angle, cone straightness, and cone quality of each sample based on the compiled set of data.

BRIEF DESCRIPTION OF THE DRAWINGS

Aspect and examples will now be described in greater detail with reference to the attached drawings, in which.

DETAILED DESCRIPTION

The following description is presented to enable a person of ordinary skill in the art to make and use various inventive aspects disclosed herein. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed for characterizing and parameterizing any of a variety of objects. In some cases, shapes other than cones may also be characterized. The exemplary system configurations, components, exemplary tolerances, design criteria, and the like provided herein are for illustrating various aspects and are not intended to limit the configurations, components, tolerances, and/or criteria that may be accounted for in such metrology systems.

Figure 1:
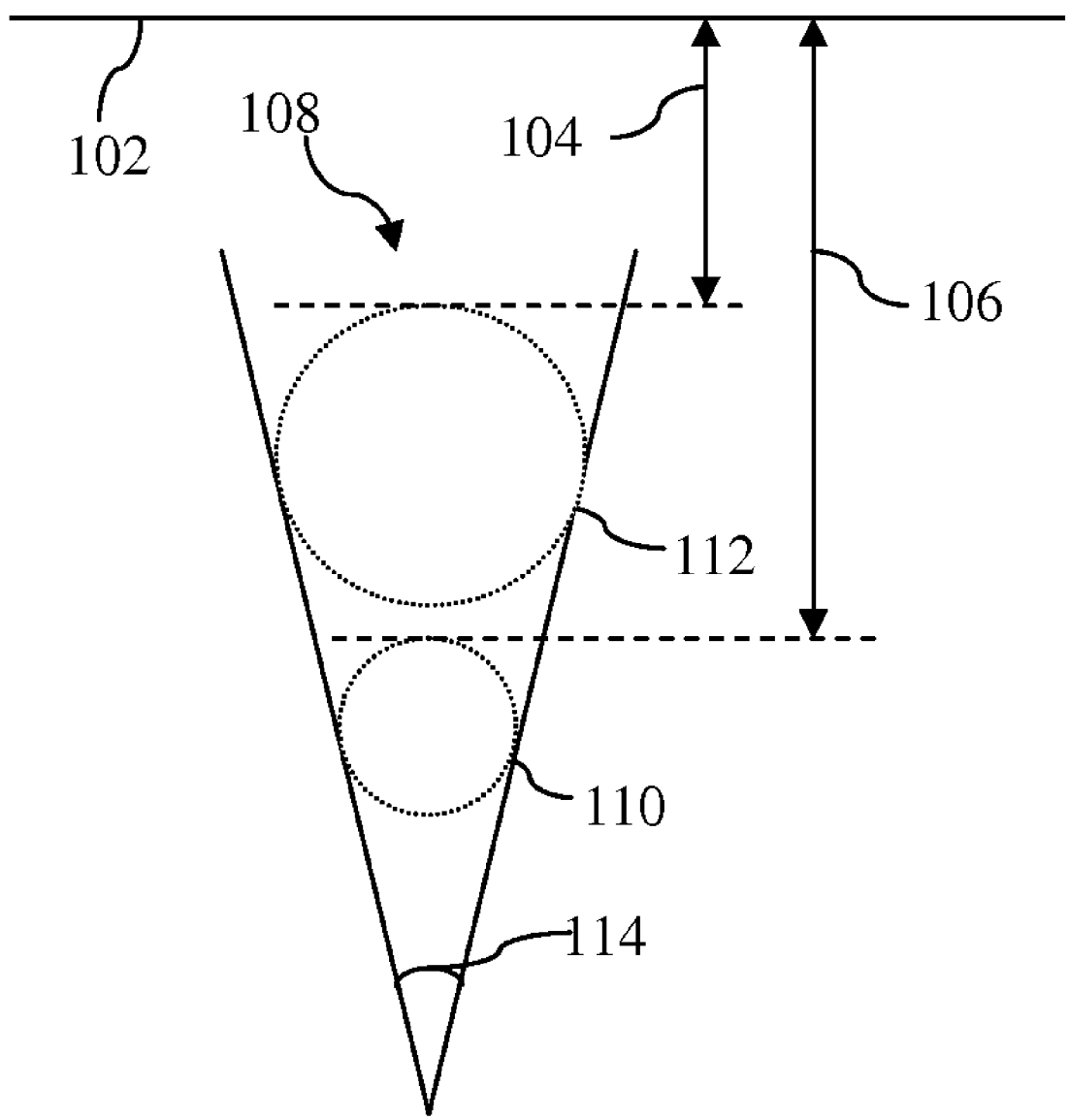
FIG. 1 illustrates a cone angle measurement technique of the prior art.
Figure 2:
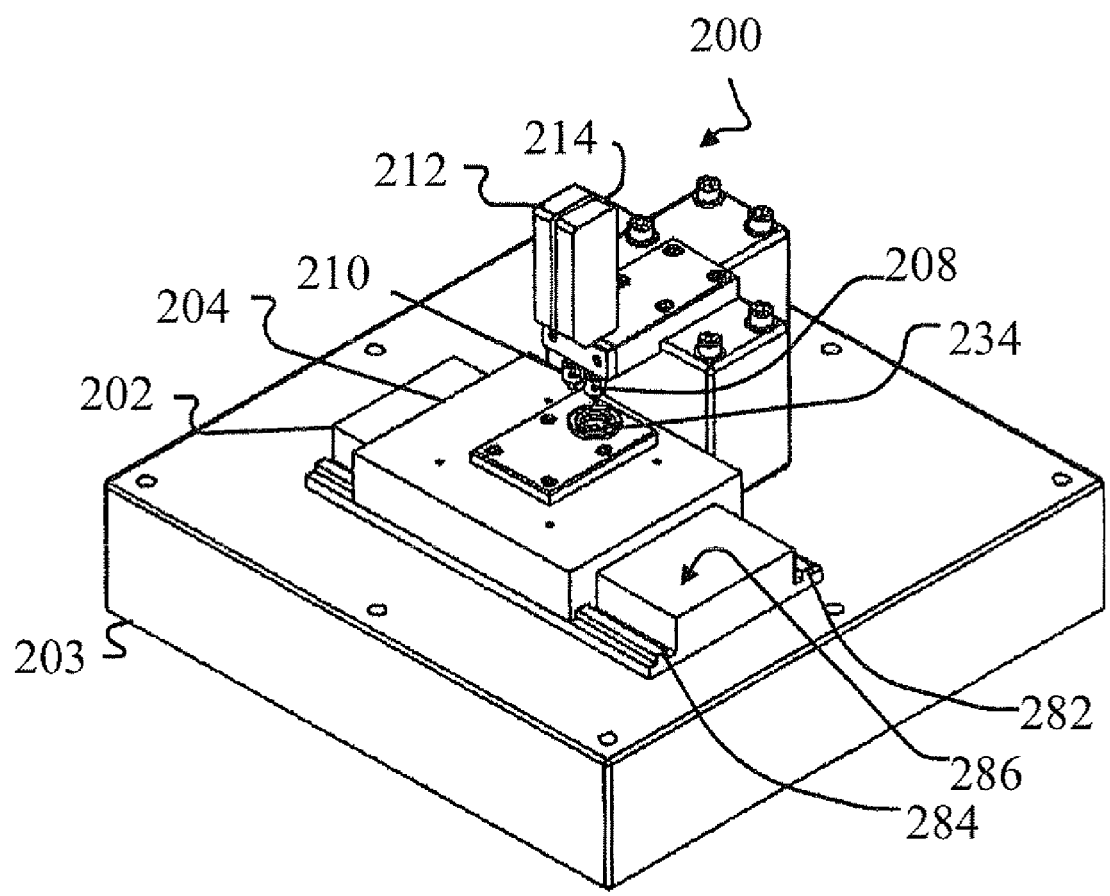
FIG. 2 illustrates a cone angle measurement system of the prior art.
Figure 3:
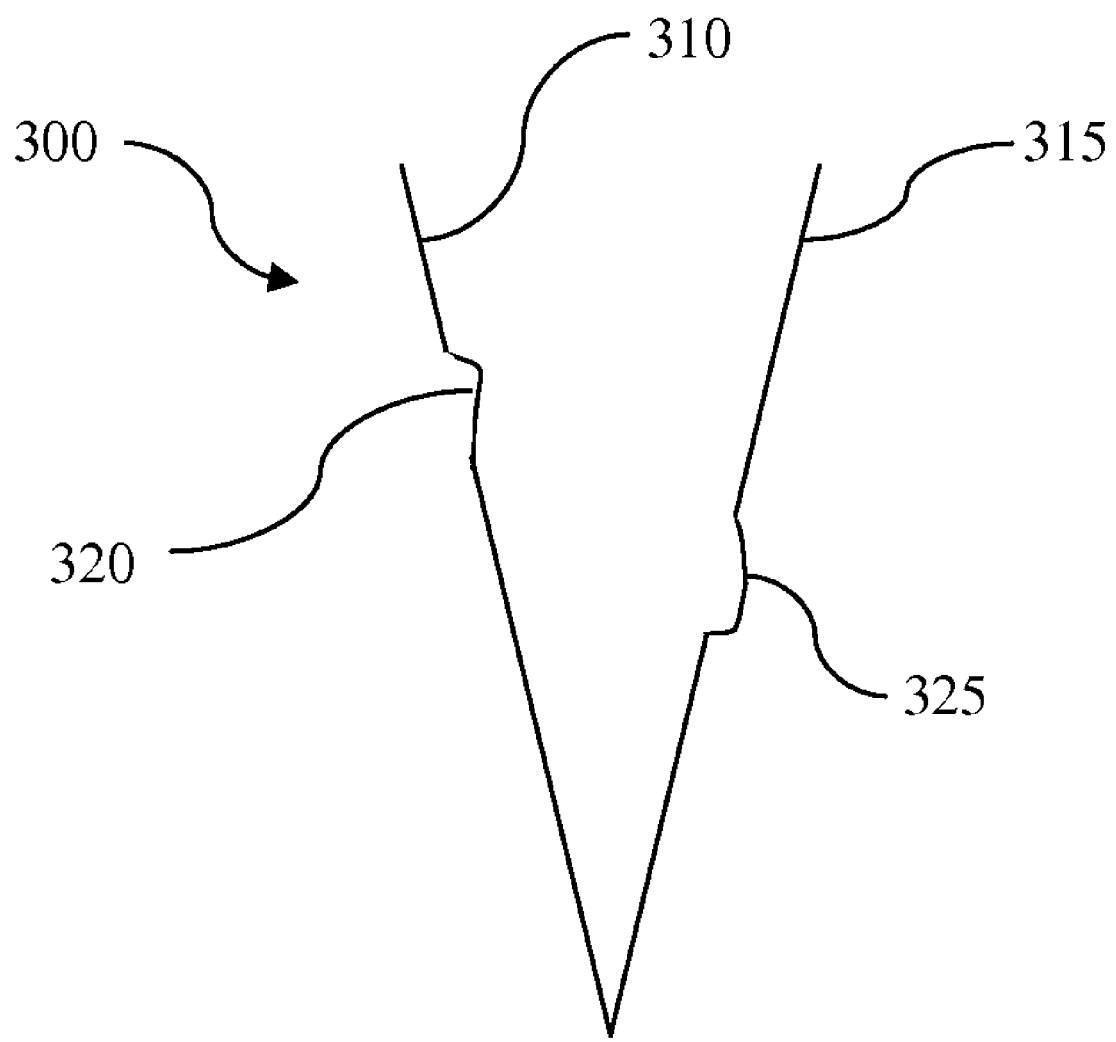
FIG. 3 illustrates a cone with possible defects.
Figure 4:
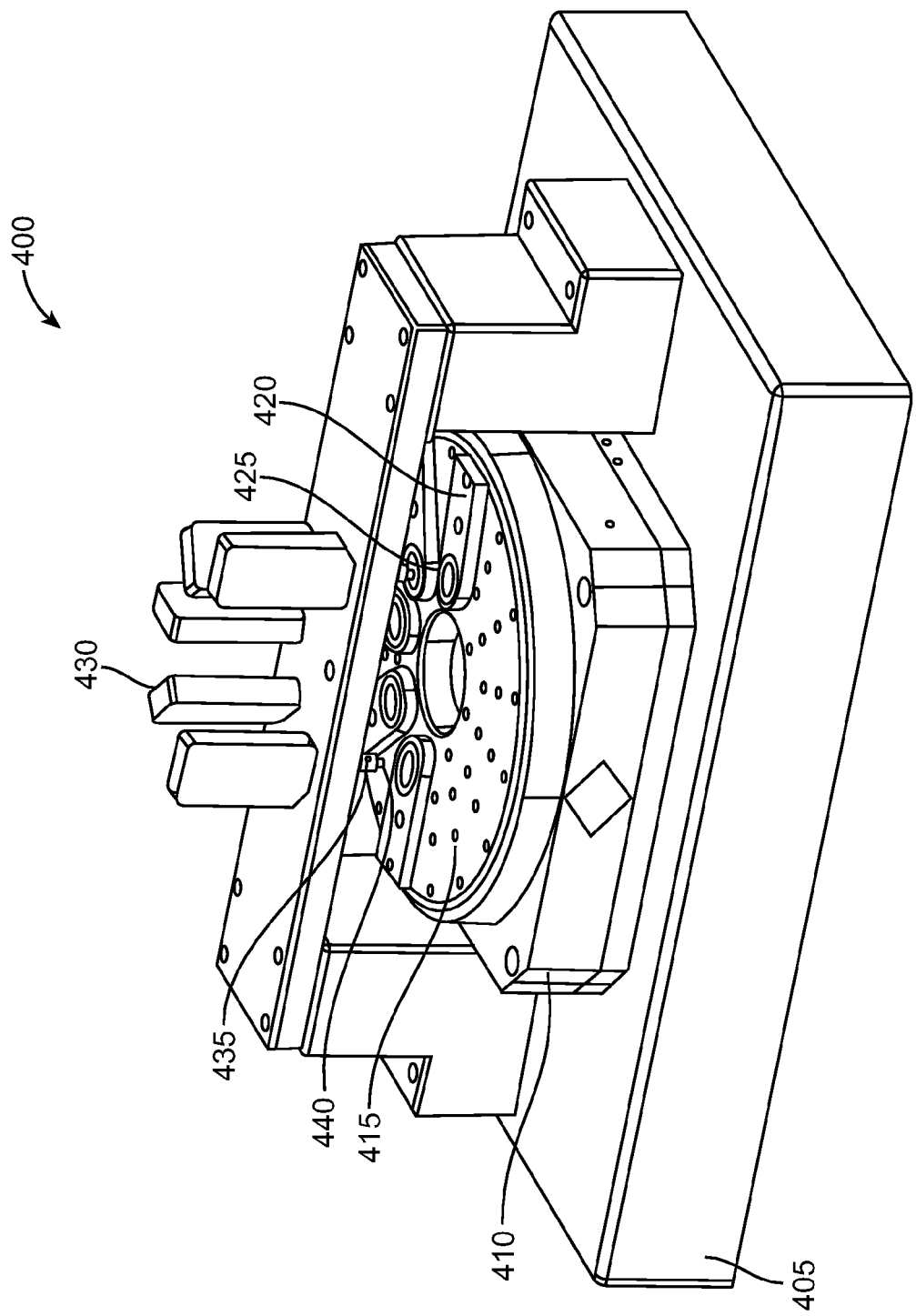
FIG. 4 illustrates an embodiment of a cone measurement system.

FIG. 4 illustrates a sleeve cone quality measurement system 400. System 400 may include a supportive base 405 that may be formed from granite or any other material capable of increasing isolation of the sensitive components of system 400 from ambient vibrations or other disturbances. A rotary stage guide 410 may be disposed atop supportive base 405. Rotary stage guide 410 may provides a rotary track over which a stage 415 may rotate. Rotary stage 415 may be a rotary air-bearing stage. Rotary stage 415 may contain a plurality of workspace 425 holding fixtures 420. Preferably, workspace 425 comprises a sleeve cone. While five holding fixtures 420 are shown, any number of holding fixtures 420 may be used. Aspects of holding fixtures 420 will be further described herein. Workspace 425 is disposed in holding fixtures 420 to provide accessibility to a cavity of the sleeve cone. An outer surface portion of the workspace 425 may take any number of shapes, for example, the outer portion may be cylindrical, and need not be conically tapered. Holding fixtures 420 may be adapted to accommodate such variations in workspace 425.

System 400 further includes a plurality of measuring devices 430 positioned to measure the interior of the workspaces 425. While five measuring devices 430 are shown any number of measuring devices 430 may be used. Each measuring device 430 contains a respective plunger 435 to which a respective contact element 440 is coupled. Measuring devices 430 are capable of extending plungers 435 so that contact element 440 touches workspace 425. Once contact element 440 has reached a maximum amount of extension into workpiece 425, measuring device 430 can measure an amount of extension. Each contact element 440 can of a different size than the other contact elements 440, so long as two or more differently sized elements are provided. Contact elements 440 are preferably spherical, however they may be any shape capable of fitting into a sleeve cone, including but not limited to hemispherical and conical, so long as they have a circular cross section for contacting circular a cross-section of the workpiece into which such elements 440 will extend.

The amount of extension may be used as indicia of the position of the contact element 440 in the workpiece 425. These indicia of position may be viewed or otherwise interpreted into a height of the contact element 440 with respect to a reference. Each measuring device 430 may be controlled by a gauge controller that controls the amount of extension of each plunger 435 and determines when the contact element 440 touches the workpiece.

Figure 5:
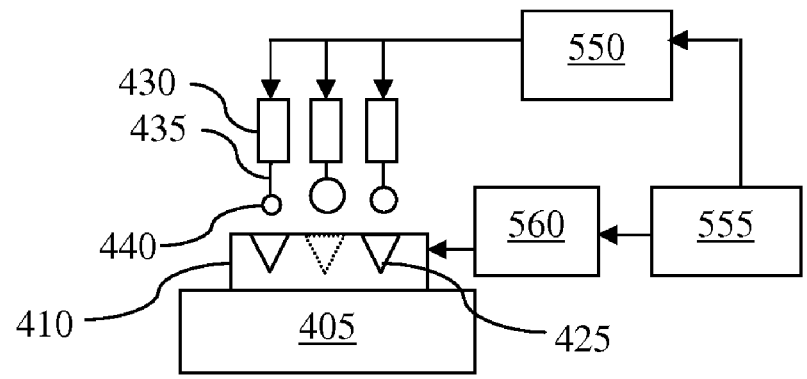
FIG. 5 is a schematic of an embodiment of a cone measurement system.

FIG. 5 is a schematic of the measuring system 400 with the associated control units. Each measuring device 430 may be in communication with a gauge controller 550, which in turn, may be in communication with a central processing unit 555. The central processing unit 555 may interface with the gauge controller 550 to control each of the measuring devices 430 and a stage controller 560 to control rotary stage guide 410. The central processing unit 555 may direct the stage controller 560 to rotate the rotary stage guide 410 so that at least one workspace 425 is substantially located in line with a contact element 440 of a measuring device 430.

Once the rotary stage 415 is positioned, the central processing unit 555 directs gauge controller 550 to extend the plungers 435 of each measuring device 430 so that the contact elements 440 touch the workpieces 425. Once the amount of extension is recorded, the central processing unit 555 may then direct the gauge controller 550 to retract the plungers 435 so that the rotary stage 415 may be rotated again. The central processing unit 555 repeats the process until each measuring unit 430 has measured each workpiece 425.

In exemplary aspects, the stage controller 560 and the gauge controller 550 interface respectively with the rotary stage 416 and the measuring devices 430 at least partially pneumatically. For example, the measuring devices 430 may each include plunger controls that interface with gauge controllers 550 through pneumatic control lines. By applying air pressure through the pneumatic control lines, plunger controller may initiate extension of the plungers 435.

By applying vacuum to those pneumatic control lines, plunger controller may also slow extension of, and retract, the plungers 435. Retraction and slowing may also be initiated by spring mechanisms associated with the plunger controller. A rate at which the plungers 435 may extend may be controlled to prevent damage to the workpieces 425. Timing of slowing extension of the plungers 435 may be controlled to allow rapid extension, and then slowing at a time before contact with the workspace 425. An amount of pressure (vacuum or greater than ambient) and/or volume of gas may be selectable based on the weights of the plungers 435 and the contact elements 440.

Figure 6:
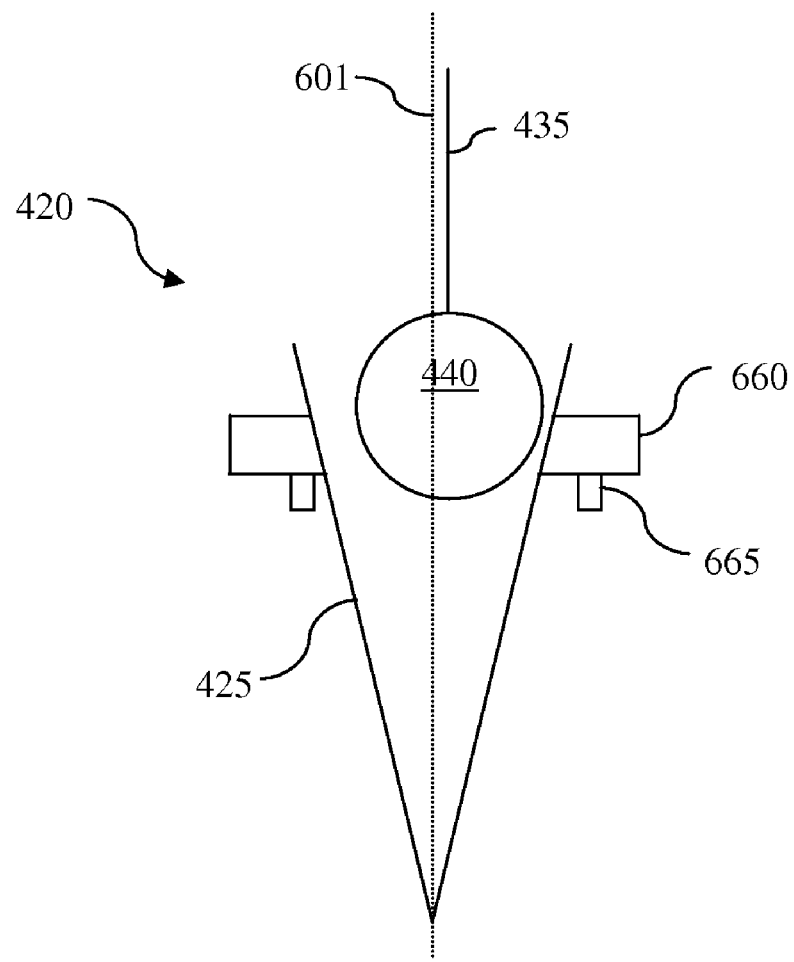
FIG. 6 illustrates a holding fixture.

FIG. 6 is a side view of a holding fixture 420. During rotation of rotary stage 415, the center line 601 of workpiece 425 may not stop directly under contact element 440 (as shown in FIG. 6, where the center line 601 of workpiece 425 is slightly off to the side of contact element 440). Therefore, to correct any misalignment of the contact element 440 and the workpiece 420, workpiece 425 may be nearly free floating so that it can self-align responsively to contact with contact element 440.

Due to the angle of workpiece 425's walls, contact elements 440 tend to exert some force horizontally (in addition to the obvious vertical forces) when resting on workpiece 425. Therefore, there may be a low-friction interface between surfaces of workpiece 425 and fixture 420 and/or between fixture 420 and rotary stage 415 (i.e., a coefficient of friction low enough to allow movement of workpiece 425 relative to rotary stage 415 under the horizontal force applied by contact elements 440). A low-friction interface between complementary surfaces of workpiece 425 and holding fixture 420 provides a desirable (e.g. lower) contact position of contact element 440 inside workpiece 425, thereby providing increased consistency of measurement.

In an exemplary embodiment of the invention, workpiece 425 comprises steel and is held by a holding fixture 420. Workpiece 425 may sit inside a ring 660 comprised of a low friction material. Preferably, the low friction material is at least partially sapphire. A metal-sapphire surface has a low coefficient of friction of about 0.1-0.15. Ring 660 in turn sits atop a surface 665 of holding fixture 420. Preferably, surface 665 is a polished/ground steel surface on which ring 660 can glide.

During use of system 400, gauge controller 550 may control measuring devices 430 to extend plunger 435 twice for each measurement. The first extension may properly align workpiece 425 under measuring device 430 so that contact element 440 can have a greater chance of being seated as far down as possible into workpiece 425 and the second extension may be used for measuring the amount of extension for data collection.

Figure 7:
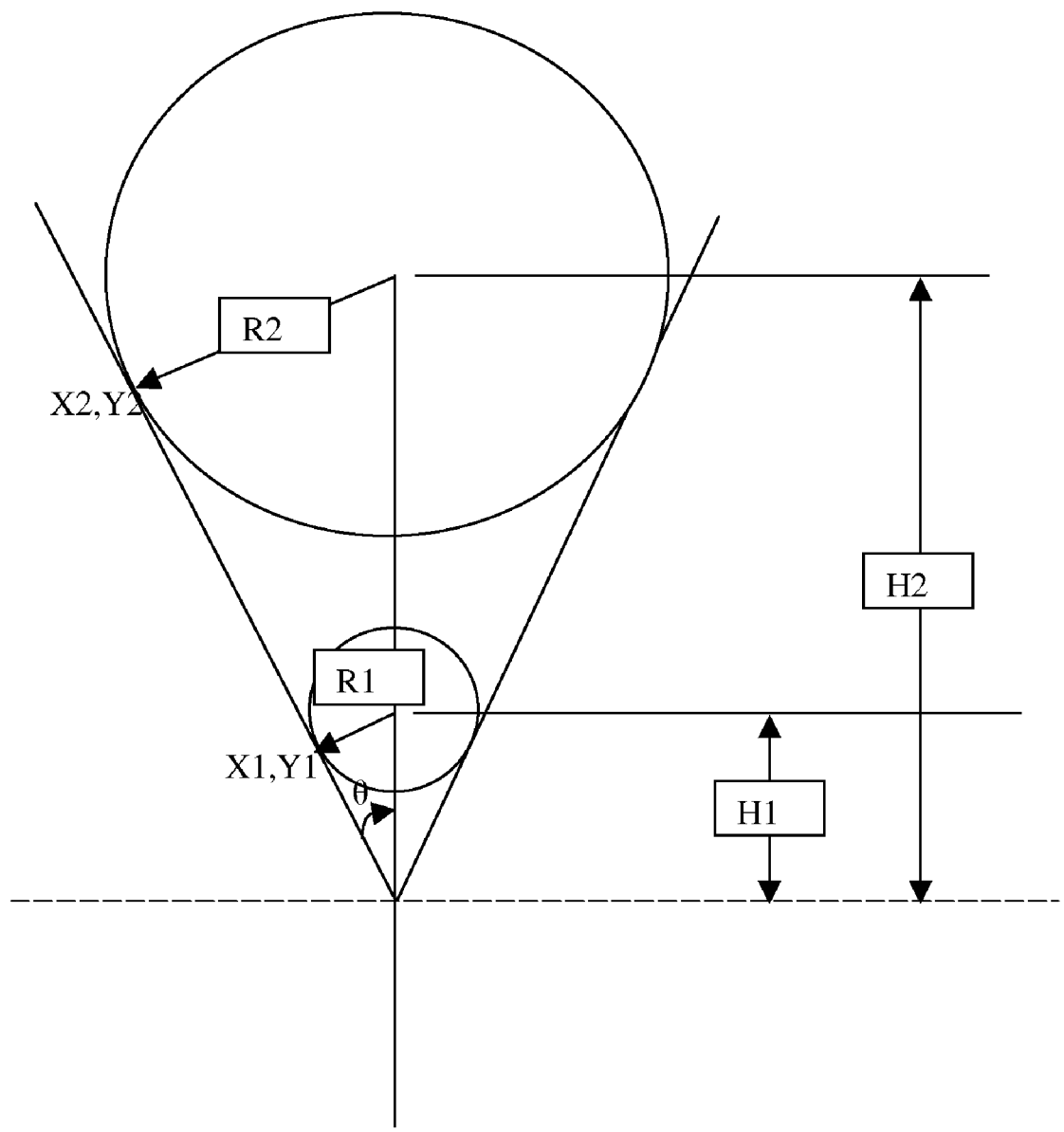
FIG. 7 illustrates the measurement technique.

Each measuring device 430 can measure the extension of its respective plunger 435 into a workpiece 425, and the data can be recorded in a computer readable medium such as a RAM. The computer processor can use a Least Square model of fitting the data to determine the taper angle of the workpiece 425; other aspects that can be determined include cone straightness, and cone quality, as explained further below. FIG. 7 illustrates a concept of the measurement technique using spheres as contact elements. Using a minimum of two contact elements can provide a measure of cone taper angle. Using more contact elements can allow obtaining data that can be used to obtain measures of cone straightness and cone quality, as described below. While FIG. 7 shows two contact elements (for simplicity), any number of contact elements can be used. Preferably, five contact elements are used. The following general equations are used to determine the Least-Square fit for n contact elements:

$$f[n] := \sum_{i=1}^{n} (r_i - c\text{Cos}[\theta] - h_i\text{Sin}[\theta])^2$$

$$F[n] := D[f[n], \theta] == 0$$

$$G[n] := D[f[n], c] == 0$$

Where r is the radius of each contact element, h is the height of each contact element from a reference position (determinable based on measuring plunger extension in some examples herein), and c is a constant. F[n] and G[n] are minimization functions with respect to $\theta$ and c, respectively. By solving the equations for $\theta$ it is possible to determine the taper angle of the workpiece 425.

Once the angle is calculated, the merit function (or cone quality), which determines if any errors occurred in the measurement, and cone straightness, which determines if there are any deviations from the expected straight line of the cone wall, can be calculated. These calculations generally involve comparing data derived from individual contact elements with some averaging data for the more of the contact elements. In a particular example, the merit function is derived from the R-squared (Rsq) value and is the higher resolution of Rsq, where Rsq=0.999999896 and Merit=90. By using the following equation, Rsq can be calculated:

$$Rsq = 1 - \frac{SSE}{SST}$$

Where:

$SSE = \sum_{i=1}^{n} (Rc_i - r_i)^2$, and $SST = \sum_{i=1}^{n} (Ravg - r_i)^2$ Where r is the original ball radius, Rc is the computed ball radius (computed using the equation $Rc = h \sin(\theta) + C \cos(\theta)$), h is the height, and Ravg is the average radii. Finally, the Merit can be calculated using the equation:

Merit=Rsq*10^8-99999900

The Straightness (Str) uses the location of the tangent point (using the equation $L = h - r \sin(\theta)$) of each ball to determine the Straightness Error at each tangent point using the following equation:

$Str_i = Rc_i - r_i$

From this, the overall Straightness can be determined using the following equation:

$Str = \text{Max}(Rc_i - r_i) - \text{Min}(Rc_i - r_i)$

The overall Straightness and Merit can be compared with a specification, and if both are within the specification, then the workpiece can be allocated for use in a disc drive motor or some other suitable mechanism. On the other hand, if the workpiece is not within the specification, then the workpiece may be discarded, or the workpiece may be subjected to another metrology run.

In certain embodiments, system 400 may include a calibration element. The calibration element may be positioned within a holding fixture 420 in place of a workpiece 425. The central processing unit 555 may direct the gauge controller 550 to extend each plunger 435 of each measuring device 430 so that each contact element 440 touches the calibration element to determine the relative height of the gauges before measuring the workpiece 425. Such a configuration may increase the accuracy of the measurements.

This description is exemplary and it will be apparent to those of ordinary skill in the art that numerous modifications and variations are possible. For example, various exemplary methods and systems described herein may be used alone or in combination with various additional metrology systems and other systems for determining suitability of a workpiece under a given specification. Additionally, particular examples have been discussed and how these examples are thought to address certain disadvantages in related art. This discussion is not meant, however, to restrict the various examples to methods and/or systems that actually address or solve the disadvantages.

We claim:

1. A metrology system comprising:
    a rotary stage;
    at least one holding fixture, each for holding at least one conical sample;
    a plurality of differently sized measurement devices positioned adjacent to the rotary stage for interfitting, in a measuring state, with the samples to obtain data useful in determining one or more characteristics of the samples, wherein the rotary stage is free to rotate when the measuring devices are in a non-measuring state; and
    a processor communicatively coupled with the measurement devices, and operable to use the data from the measurement devices for calculating a cone angle, a cone straightness, and a cone quality of each sample.

2. The metrology system of claim 1, wherein each measurement device includes:
    a contact element for the interfitting with the samples;
    a plunger coupled to the contact element and operable to extend the contact element towards the samples; and
    a gauge adapted to measure the extension of the plunger after contact by the contact element with the sample.

3. The metrology system of claim 2, further comprising a gauge controller for controlling the measuring devices, and a stage controller for controlling the rotary stage, wherein the processor is operable to coordinate the gauge controller and the stage controller.

4. The metrology system of claim 2, further comprising a plunger controller, wherein the plunger controller is operable to use air pressure for extending each plunger and to use vacuum to retract each plunger.

5. The metrology system of claim 2, wherein a shape of the contact element is from a group consisting of a sphere and a hemisphere.

6. The metrology system of claim 5, wherein each measurement device contact element has a diameter different than respective diameters of the contact elements of other measuring devices.

7. The metrology system of claim 2, wherein the measurement devices include three or more measurement devices, and cone quality and straightness are calculated using differences between respective contact element radii and radii calculated using measured extension of its plunger after contacting each sample.

8. The metrology system of claim 2, wherein the gauge is adapted to measure the extension of the plunger after sample alignment caused by an initial contact between the contact element and the sample, which can result in further extension of the plunger from an initial contact point.

9. The metrology system of claim 1, wherein each sample includes a sleeve cone.

10. The metrology system of claim 1, wherein the rotary stage is supported by an air bearing.

11. The metrology system of claim 1, wherein each holding fixture includes a sample slot which comprises a low friction surface for supporting each sample and for allowing the sample limited movement within the sample slot.

12. The metrology system of claim 11, wherein the low friction surface includes a surface at least partially formed of sapphire.

13. The metrology system of claim 1, further comprising a calibration block for calibrating the plurality of measuring devices.

14. The metrology system of claim 13, wherein the calibration block is positioned within a sample slot.

15. The metrology system of claim 1, wherein the cone angle is determined using a Least Squares fit mathematical model.

16. The metrology system of claim 1, wherein the measurement devices are operable to simultaneously measure a plurality of samples.

17. The metrology system of claim 1, wherein the cone quality is determined using an R-squared calculation.

18. A metrology method, comprising:
    (a) placing at least one sample into at least one sample slot, wherein each sample slot is arranged within a rotary stage;
    (b) extending a measuring device to contact with each sample and recording an amount of extension of each measuring device, wherein there are a plurality of different sized measuring devices;
    (c) retracting the measuring devices;
    (d) rotating the rotary stage to a subsequent position wherein at least one sample slot is aligned with another measuring device;
    (e) repeating (b) through (d) until each sample is measured by each measuring device;
    (f) compiling a data set of data from the recorded extension of each measuring device for each sample; and
    (g) calculating a cone angle, cone straightness, and cone quality of each sample based on the data set.

19. The method of claim 18, further comprising calibrating each measuring device.

20. The method of claim 18, further comprising:
    determining if any of the plurality of samples are defective; and
    generating a use message concerning any defective samples.

21. The method of claim 18, wherein the cone quality is determined using an R-squared parameter.

22. The method of claim 18, wherein a plurality of samples are measured simultaneously.

* * * * *